United States Patent
Deng et al.

(10) Patent No.: US 12,191,773 B2
(45) Date of Patent: Jan. 7, 2025

(54) CONTROL CIRCUIT FOR A RESONANT CONVERTER HAVING AT LEAST TWO OUTPUT SIGNALS

(71) Applicant: Silergy Semiconductor Technology (Hangzhou) LTD, Hangzhou (CN)

(72) Inventors: Jian Deng, Hangzhou (CN); Xiahe Zhang, Hangzhou (CN); Qiukai Huang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 247 days.

(21) Appl. No.: 17/867,846

(22) Filed: Jul. 19, 2022

(65) Prior Publication Data
US 2023/0030593 A1 Feb. 2, 2023

(30) Foreign Application Priority Data
Jul. 29, 2021 (CN) .......................... 202110865669.7

(51) Int. Cl.
*H02M 3/335* (2006.01)
*H02M 3/00* (2006.01)

(52) U.S. Cl.
CPC ......... *H02M 3/33571* (2021.05); *H02M 3/01* (2021.05)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H02M 3/22; H02M 1/08;
(Continued)

(56) References Cited

U.S. PATENT DOCUMENTS 6,005,780 A 12/1999 Hua
6,580,258 B2 6/2003 Wilcox et al.
(Continued)

FOREIGN PATENT DOCUMENTS

CN 102231605 A 11/2011
CN 103280965 A 9/2013
(Continued)

*Primary Examiner* — Thienvu V Tran
*Assistant Examiner* — Nusrat Quddus (57) ABSTRACT

A control circuit for a resonant converter having at least two output signals, the control circuit including: a charge feedback circuit configured to generate a charge feedback signal representing a resonant current of a resonant circuit in the resonant converter; and a switching control signal generating circuit configured to generate switching control signals according to the charge feedback signal and feedback signals representing error information of each of the at least two output signals.

20 Claims, 5 Drawing Sheets

(58) Field of Classification Search
CPC .......... H02M 1/36; H02M 3/24; H02M 3/325;
H02M 3/335; H02M 3/28; H02M
3/33569; H02M 3/33507; H02M
2007/4815; H02M 2007/4818; H02M
1/083; H02M 3/33538; H02M 3/33546;
H02M 3/33515; H02M 3/33576; H02M
3/33592; H02M 3/33553; H02M 3/33523;
H02M 3/1584; H02M 3/285; H02M
3/33561; H02M 7/49; H02M 1/045;
H02M 7/006; H02M 7/06; H02M 7/068;
H02M 7/153; H02M 7/10; H02M 1/088;
H02M 7/103; H02M 7/106; H02M 7/19;
H02M 7/08; H02M 7/17; H02M
2001/007; H02M 7/493; H02M 7/53806;
H02M 7/5381; H02M 7/483; H02M
7/217; H02M 7/538466; H02M 7/5387;
H02M 7/53871; H02M 7/53873; H02M
7/53875; H02M 1/084; H02M 1/0845;
H05B 39/048; B23K 11/24; H04B
2215/069; Y02B 70/1491; H02J 3/46;
H02J 3/38; G01R 19/165; G01R
19/16504; G01R 19/16509; G01R
19/16514; G01R 19/16519; G01R
19/16523; G01R 19/16528; G01R
19/16533; G01R 19/16538; G01R
19/16542; G01R 19/16547; G01R
19/16552; G01R 19/16557; G01R
19/16561; G01R 19/16566; G01R
19/16571; G01R 19/16576; G01R
19/1658; G01R 19/16585; G01R 19/1659;
G01R 19/16595; G01R 19/17
See application file for complete search history.

(56) References Cited

U.S. PATENT DOCUMENTS

| | | | |
|---|---|---|---|
| 9,325,254 B2 | 4/2016 | Deng et al. | |
| 9,331,588 B2 | 5/2016 | Chen | |
| 9,488,680 B2 | 11/2016 | Xu | |
| 11,783,788 B2* | 10/2023 | Pang | H02M 1/4225 345/204 |
| 2010/0046251 A1* | 2/2010 | Kyono | H02M 3/33561 363/21.02 |
| 2010/0188870 A1* | 7/2010 | Christensen | H02M 3/3376 363/21.02 |
| 2012/0169313 A1 | 7/2012 | Lee | |
| 2013/0250622 A1* | 9/2013 | Hosotani | H02M 3/33576 363/16 |
| 2014/0078789 A1 | 3/2014 | Li et al. | |
| 2014/0239934 A1 | 8/2014 | Zhang | |
| 2015/0160270 A1 | 6/2015 | Shi et al. | |
| 2015/0280578 A1 | 10/2015 | Huang et al. | |
| 2017/0093296 A1* | 3/2017 | Chen | H02M 1/088 |
| 2018/0342957 A1* | 11/2018 | Bianco | H02M 3/33561 |
| 2019/0200441 A1* | 6/2019 | Zhu | H02M 3/3376 |
| 2020/0266712 A1* | 8/2020 | Li | H02M 3/33507 |
| 2020/0336070 A1* | 10/2020 | Sun | H03K 5/24 |
| 2021/0091678 A1 | 3/2021 | Wang | |
| 2021/0359614 A1* | 11/2021 | Tsou | H02M 1/0058 |
| 2022/0069722 A1* | 3/2022 | Pan | H02M 1/0009 |
| 2023/0378881 A1* | 11/2023 | Wang | H02M 1/08 |

FOREIGN PATENT DOCUMENTS

| | | |
|---|---|---|
| CN | 106130378 A | 11/2016 |
| CN | 107968569 A | 4/2018 |

\* cited by examiner

CONTROL CIRCUIT FOR A RESONANT CONVERTER HAVING AT LEAST TWO OUTPUT SIGNALS

RELATED APPLICATIONS

This application claims the benefit of Chinese Patent Application No. 202110865669.7, filed on Jul. 29, 2021, which is incorporated herein by reference in its entirety.

FIELD OF THE INVENTION

The present invention generally relates to the field of power electronics, and more particularly to control circuits and associated resonant converters.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

As compared with traditional switching converters, resonant converters have advantages of low switching loss, high conversion efficiency, and high power density. In an example multi-output resonant converter, the multi-channel output signals can be adjusted by directly controlling the conduction time of the switch in the half-bridge of the resonant converter, which is equivalent to the frequency control. However, the frequency control in such an example may have relatively poor dynamic response due to limited bandwidth of the resonant converter, thereby impacting system performance.

Figure 1:
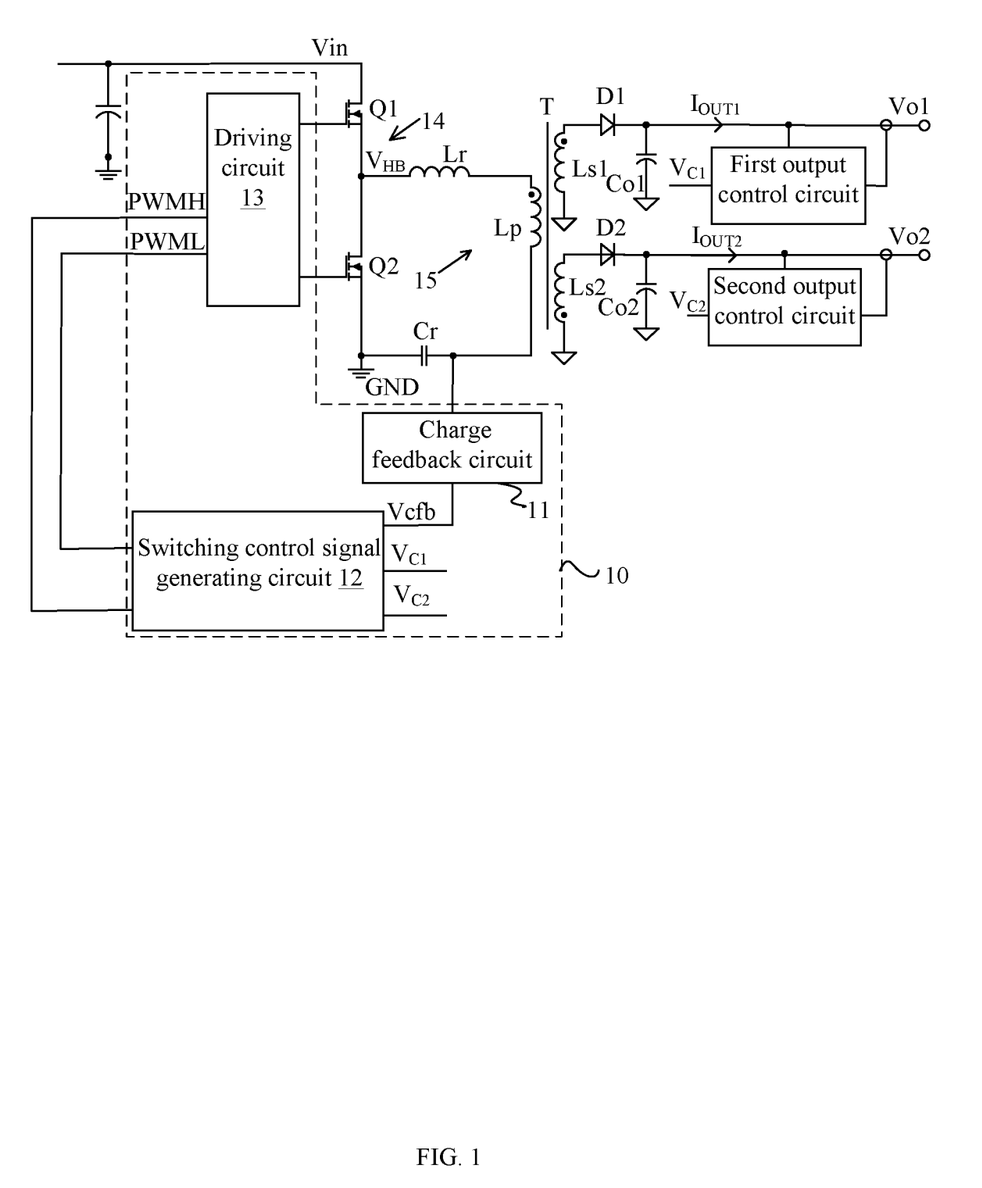
FIG. 1 is a schematic block diagram of a first example resonant converter with a control circuit, in accordance with embodiments of the present invention.

Referring now to FIG. 1, shown is a schematic block diagram of a first example resonant converter with a control circuit, in accordance with embodiments of the present invention. This particular example resonant converter can include switch circuit 14 including at least one half-bridge. The half-bridge can include transistors Q1 and Q2 connected in series between input voltage Vin and reference ground GND. Switch circuit 14 can be controlled by control circuit 10, in order to generate a periodic square wave voltage $V_{HB}$. Switch circuit 14 can drive resonant circuit 15. Here for example, the resonant topology is an LLC circuit. Resonant circuit 15 can include inductor Lr connected in series to common node HB of transistors Q1 and Q2, primary winding Lp, and resonant capacitor Cr. The first terminal of resonant capacitor Cr can connect to primary winding Lp, and the second terminal of resonant capacitor Cr can connect to reference ground GND directly, or through a resonant resistor.

Primary winding Lp can be coupled with two secondary windings Ls1 and Ls2, to together form transformer T. Secondary winding Ls1 can connect to the anode of diode D1, the cathode of diode D1 can connect to output capacitor Co1, and the non-ground terminal of output capacitor Co1 (i.e., the first output terminal) may generate output voltage Vo1 and/or output current $I_{OUT1}$. Secondary winding Ls2 can connect to the anode of diode D2, the cathode of diode D2 can connect to output capacitor Co2, and the non-ground terminal of output capacitor Co2 (i.e., the second output terminal) can generate output voltage Vo2 and/or output current $I_{OUT2}$. It should be understood that the resonant topology is not limited to the LLC circuit, and inductor Lr can be the leakage inductor of primary winding Lp or an additional auxiliary inductor. Also, the positions of inductor Lr and resonant capacitor Cr are not limited to those shown, as long as they are connected in series in the resonant tank. It should also be understood that the output signal here can be an output voltage or an output current, and the control object can be determined according to particular requirements of constant current output or constant voltage output.

While this description takes the half-bridge LLC resonant converter as an example, those skilled in the art will recognize that the resonant converter is not limited to the half-bridge topology, and a full-bridge resonant converter can also be applied in certain embodiments. In addition, the resonant circuit is not limited to LLC, and other resonant circuits (e.g., LCC, etc.) are also suitable in particular embodiments.

In particular embodiments, when a first switch unit (e.g., transistor Q1) in switch circuit 14 is turned on, the energy on the primary side of transformer T may be transmitted to the first output terminal through first secondary winding Ls1. Also, when the second switch unit (e.g., transistor Q2) in switch circuit 14 is turned on, the energy on the primary side of transformer T may be transmitted to the second output terminal through second secondary winding Ls2, where the first output signal is generated at the first output terminal, and the second output signal is generated at the second output terminal. Correspondingly, the two output terminals of the resonant converter correspond to the two secondary windings of transformer T respectively, whereby the first output terminal is coupled to a dotted terminal of first secondary winding Ls1, and the second output terminal is coupled to a non-dotted terminal of second secondary winding Ls2. The first output control circuit can connect to the first output terminal, in order to adjust the first output signal and generate feedback signal $V_{C1}$. The second output control circuit can connect to the second output terminal, in order to adjust the second output signal and generate feedback signal $V_{C2}$.

Further, the first output control circuit can adjust the first output signal, and generate feedback signal $V_{C1}$ according to an error between a sampled signal Vfb1 characterizing the first output signal and a first reference signal. The second output control circuit can adjust the second output signal, and generate feedback signal $V_{C2}$ according to an error between a sampled signal Vfb2 characterizing the second output signal and a second reference signal. Feedback signals $V_{C1}$ and $V_{C2}$ may be provided to control circuit 10 at the primary side. For example, the first and second output control circuits may transmit feedback signals $V_{C1}$ and $V_{C2}$ respectively to control circuit 10 at the primary side through isolation couplers (e.g., an optocoupler).

In particular embodiments, control circuit 10 can include charge feedback circuit 11, switching control signal generating circuit 12, and driving circuit 13. Charge feedback circuit 11 can connect to a first terminal of resonant capacitor Cr for sampling the resonant current flowing through the resonant circuit, in order to generate charge feedback signal Vcfb. The DC component of charge feedback signal Vcfb can be equal to bias voltage $V_{BIAS}$. In one example, charge feedback circuit 11 can obtain AC component Vcfb1 of the charge feedback signal based on a divided voltage across resonant capacitor Cr in the resonant circuit, and then may superimpose AC component Vcfb1 on bias voltage $V_{BIAS}$ to generate charge feedback signal Vcfb. In another example, charge feedback circuit 11 can generate an integration current that changes in a same trend as the resonant current, and then the integration current can charge and discharge a capacitor to generate AC component Vcfb1 of the charge feedback signal. Then, AC component Vcfb1 can be superposed on bias voltage $V_{BIAS}$, in order to generate charge feedback signal Vcfb.

In certain embodiments, the DC bias of charge feedback signal Vcfb can be controlled because it may be difficult for charge feedback circuit 11 to directly obtain the actual value of charge feedback signal Vcfb during the sampling process, while AC component Vcfb1 of charge feedback signal Vcfb can be directly obtained. After obtaining AC component Vcfb1, the DC component can be set to a reasonable bias voltage $V_{BIAS}$ through the control method. For example, the value of bias voltage $V_{BIAS}$ may avoid negative parameter values in the control circuit.

Switching control signal generation circuit 12 can generate switch control signals for controlling switch circuit 14 according to charge feedback signal Vcfb, feedback signal $V_{C1}$ representing error information of the first output signal, and feedback signal $V_{C2}$ representing error information of the second output signal. For example, the switch control signals can include control signal PWMH for controlling the on-off state of transistor Q1, and control signal PWML for controlling the on-off state of transistor Q2. For example, control signals PWMH and PWML can be complementary. In order to prevent transistors Q1 and Q2 from being turned on at the same time, a dead time can be reserved between control signals PWMH and PWML. That is, when transistor Q1 is turned off, transistor Q2 can be turned on after the dead time has elapsed, and when transistor Q2 is turned off, transistor Q1 can be turned on after the dead time has elapsed.

For example, switching control signal generating circuit 12 may determine the turn-off moment of the second switch unit (e.g., transistor Q2) based on charge feedback signal Vcfb and feedback signal $V_{C1}$. Based on charge feedback signal Vcfb and feedback signal $V_{C2}$, switching control signal generating circuit 12 may determine the turn-off moment of the first switch unit (e.g., transistor Q1), thereby generating a corresponding switch control signal to control the switching actions of transistors Q1 and Q2 in switch circuit 14, and controlling the resonant converter in order to realize the energy conversion.

Further, when charge feedback signal Vcfb rises to the sum $V_{BIAS}+V_{C2}$ of bias voltage $V_{BIAS}$ and feedback signal $V_{C2}$, switching control signal generating circuit 12 can deactivate control signal PWMH to turn off transistor Q1, and turn on transistor Q2 after the dead time. At this time, periodic square wave voltage $V_{HB}$ generated by switch circuit 14 can be switched from a high voltage corresponding to input voltage Vin to a low voltage corresponding to reference ground GND. When charge feedback signal Vcfb drops to a difference of the $V_{BIAS}-V_{C1}$ between bias voltage $V_{BIAS}$ and feedback signal $V_{C1}$, switching control signal generating circuit 12 can deactivate control signal PWML to turn off transistor Q2, and turn on transistor Q1 after the dead time has elapsed. At this time, the periodic square wave voltage $V_{HB}$ generated by switch circuit 14 can be switched from a low voltage corresponding to reference ground GND to a high voltage corresponding to input voltage Vin.

In particular embodiments, driving circuit 13 may receive control signals PWMH and PWML, and generate corresponding driving signals accordingly to drive transistors Q1 and Q2 to perform switching operations. It can be seen that, in the control circuit of certain embodiments, when each load of the resonant converter changes, the upper limit value and/or the lower limit value of the charge feedback signal can also change along with the change of the corresponding feedback signal, such that the adjustment of the conduction time of the transistor is realized by changing the turn off moment of the transistor in the switch circuit. This control approach can be equivalent to adding a first-order charge inner loop based on the closed-loop control of the two outputs, but the entire control loop is effectively simplified to an approximate first-order system. In this way, a higher bandwidth and better dynamic responsive performance can be achieved, along with relatively simple controls and associated lower costs.

Figure 2:
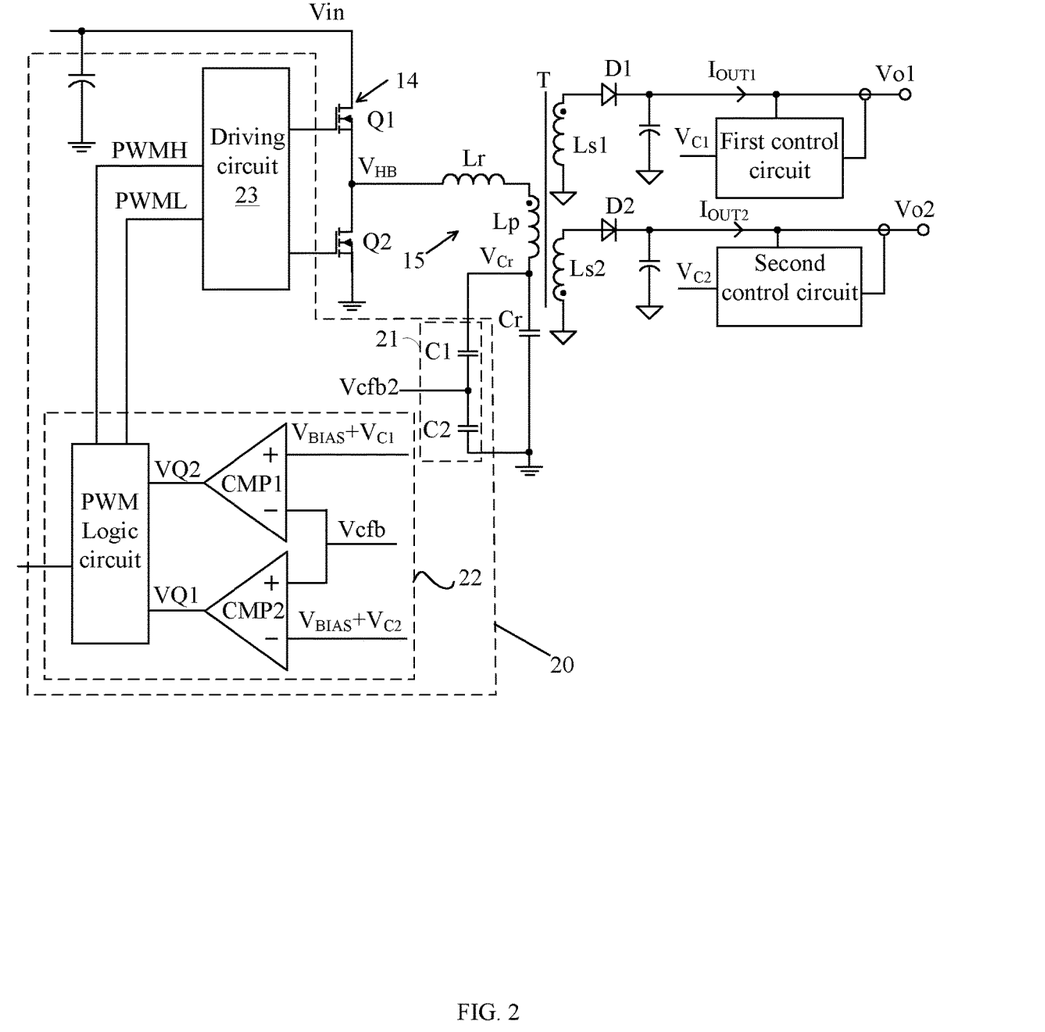
FIG. 2 is a schematic block diagram of a second example resonant converter with a control circuit, in accordance with embodiments of the present invention.

Referring now to FIG. 2, shown is a schematic block diagram of a second example resonant converter with a control circuit, in accordance with embodiments of the present invention. In this particular example, control circuit 20 can include charge feedback circuit 21, switching control signal generating circuit 22, and driving circuit 23. Charge feedback circuit 21 can sample the resonant current flowing through the resonant circuit, in order to generate charge feedback signal Vcfb. The DC component of charge feedback signal Vcfb can be equal to bias voltage $V_{BIAS}$ For example, charge feedback circuit 21 may obtain divided voltage Vcfb2 representing the AC component of the charge feedback signal based on a voltage across resonant capacitor Cr in the resonant circuit. The AC component of the charge feedback signal can be obtained by high-pass filtering divided voltage Vcfb2. Charge feedback signal Vcfb is obtained by superposing the AC component on bias voltage $V_{BIAS}$. Further, charge feedback circuit 21 can connect in parallel at both terminals of resonant capacitor Cr, which may include voltage dividing capacitors C1 and C2 connected in series. Thus, divided voltage Vcfb2 representing AC component Vcfb1 of the charge feedback signal can be generated at the common node between voltage dividing capacitors C1 and C2.

In particular embodiments, switching control signal generating circuit 22 may determine a turn-off moment of transistor Q2 based on charge feedback signal Vcfb and feedback signal $V_{C1}$. Switching control signal generating circuit 22 may determine the turn-off moment of transistor Q1 based on charge feedback signal Vcfb and feedback signal $V_{C2}$. For example, when charge feedback signal Vcfb rises to the sum $V_{BIAS}+V_{C2}$ of bias voltage $V_{BIAS}$ and feedback signal $V_{C2}$, switching control signal generating circuit 22 may deactivate control signal PWMH in order to turn off transistor Q1. Switching control signal generating circuit 22 may deactivate control signal PWML in order to turn off transistor Q2 when charge feedback signal Vcfb drops to the difference $V_{BIAS}-V_{C1}$ between bias voltage $V_{BIAS}$ and feedback signal $V_{C1}$.

Switching control signal generating circuit 22 can also include comparator CMP1, comparator CMP2, and a pulse-width modulation (PWM) logic circuit. The inverting input terminal of comparator CMP1 may receive charge feedback signal Vcfb, and the non-inverting input terminal of comparator CMP1 may receive the difference $V_{BIAS}-V_{C1}$ between bias voltage $V_{BIAS}$ and feedback signal $V_{C1}$, in order to generate turn-off signal VQ2 indicating that transistor Q2 is off at the output terminal. The non-inverting input terminal of comparator CMP2 may receive charge feedback signal Vcfb, and the inverting input terminal of comparator CMP2 may receive the sum $V_{BIAS}+V_{C2}$ of bias voltage $V_{BIAS}$ and feedback signal $V_{C2}$, in order generate turn-off signal VQ1 indicating that transistor Q1 is off at the output terminal. The PWM logic circuit can generate control signals PWMH and PWML according to turn-off signals VQ1 and VQ2.

Figure 3:
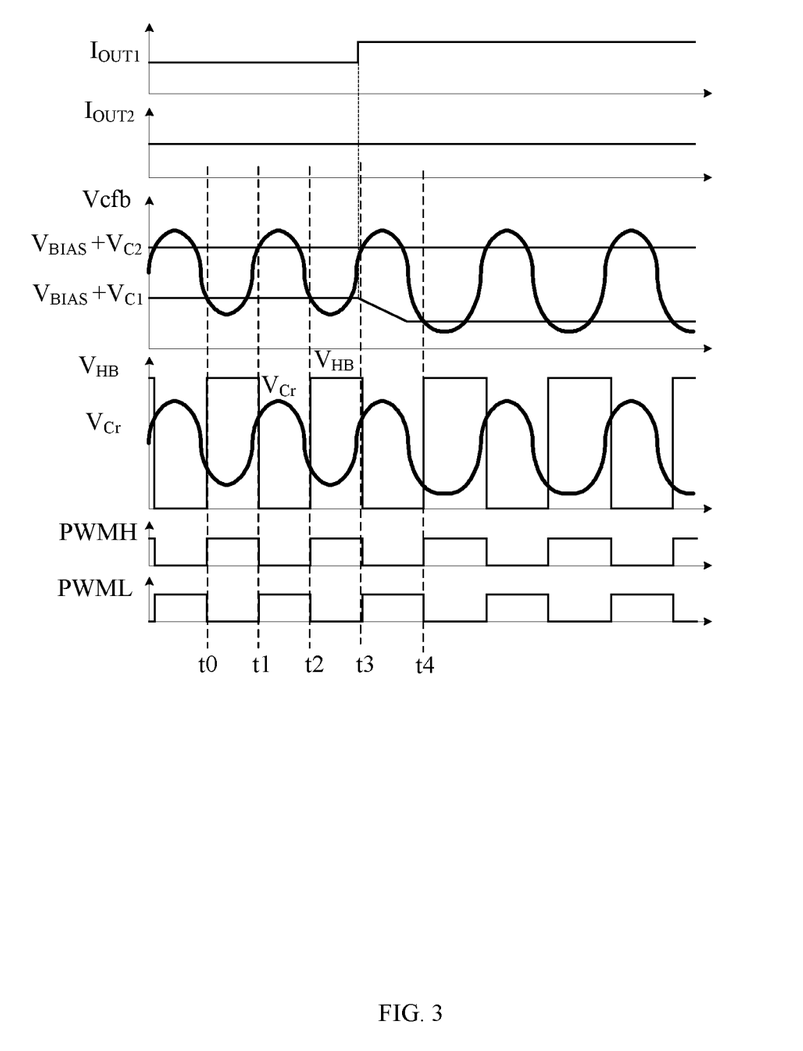
FIG. 3 is waveform diagram of a first example operation of the resonant converter, in accordance with embodiments of the present invention.

Referring now to FIG. 3, shown is a waveform diagram of a first example operation of the second example resonant converter with a control circuit, in accordance with embodiments of the present invention. In this particular example, at time t0, control signal PWMH is at a high level, control signal PWML is at a low level, transistor Q1 is turned on, and transistor Q2 is turned off. Switch circuit 14 may generate high-voltage periodic square wave $V_{HB}$, in order to drive the resonant circuit.

At time t1, when feedback signal Vcfb rises to the sum $V_{BIAS}+V_{C2}$ of bias voltage $V_{BIAS}$ and feedback signal $V_{C2}$, the output terminal of comparator CMP2 can generate turn-off signal VQ1 for instructing transistor Q1 to be turned off, control signal PWMH may be switched from a high level to a low level, and control signal PWML may be switched from a low level to a high level (ignoring the dead time here). Thus, transistor Q1 can be turned off, and transistor Q2 turned on, and periodic square wave voltage $V_{HB}$ may be switched from a high voltage corresponding to input voltage Vin to a low voltage corresponding to reference ground GND.

At time t2, the next switching cycle begins, charge feedback signal Vcfb drops to difference $V_{BIAS}-V_{C1}$ between bias voltage VBIAS and feedback signal $V_{C1}$, control signal PWMH can be switched from a low level to a high level, control signal PWML may be switched from a high level to a low level, and periodic square wave voltage $V_{HB}$ generated by the switch circuit can be switched from a low voltage to a high voltage;

At time t3, when charge feedback signal Vcfb rises again to the sum $V_{BIAS}+V_{C2}$ of bias voltage $V_{BIAS}$ and feedback signal $V_{C2}$, control signal PWMH can switch from a high level to a low level, control signal PWML may switch from a low level to a high level, transistor Q1 can be turned off, and transistor Q2 may be turned on. At this time, output current $I_{OUT1}$ of the first terminal can increase, such that feedback signal $V_{C1}$ increases, and difference $V_{BIAS}-V_{C1}$ of bias voltage $V_{BIAS}$ and feedback signal $V_{C1}$ decreases. Thus, the time for charge feedback signal Vcfb to drop to the difference $V_{BIAS}-V_{C1}$ between bias voltage $V_{BIAS}$ and feedback signal $V_{C1}$ can increase, and then the conduction time of transistor Q2 may be increased, until time t4 transistor Q2 is turned off. Since the conduction time of transistor Q2 increases in this stage, during the subsequent conduction period of transistor Q1, the resonant circuit may have a larger initial energy, which can transfer more energy to the load and maintain the increase of the output current, in order to achieve the adjustment of increasing output current $I_{OUT1}$ of the first terminal.

Figure 4:
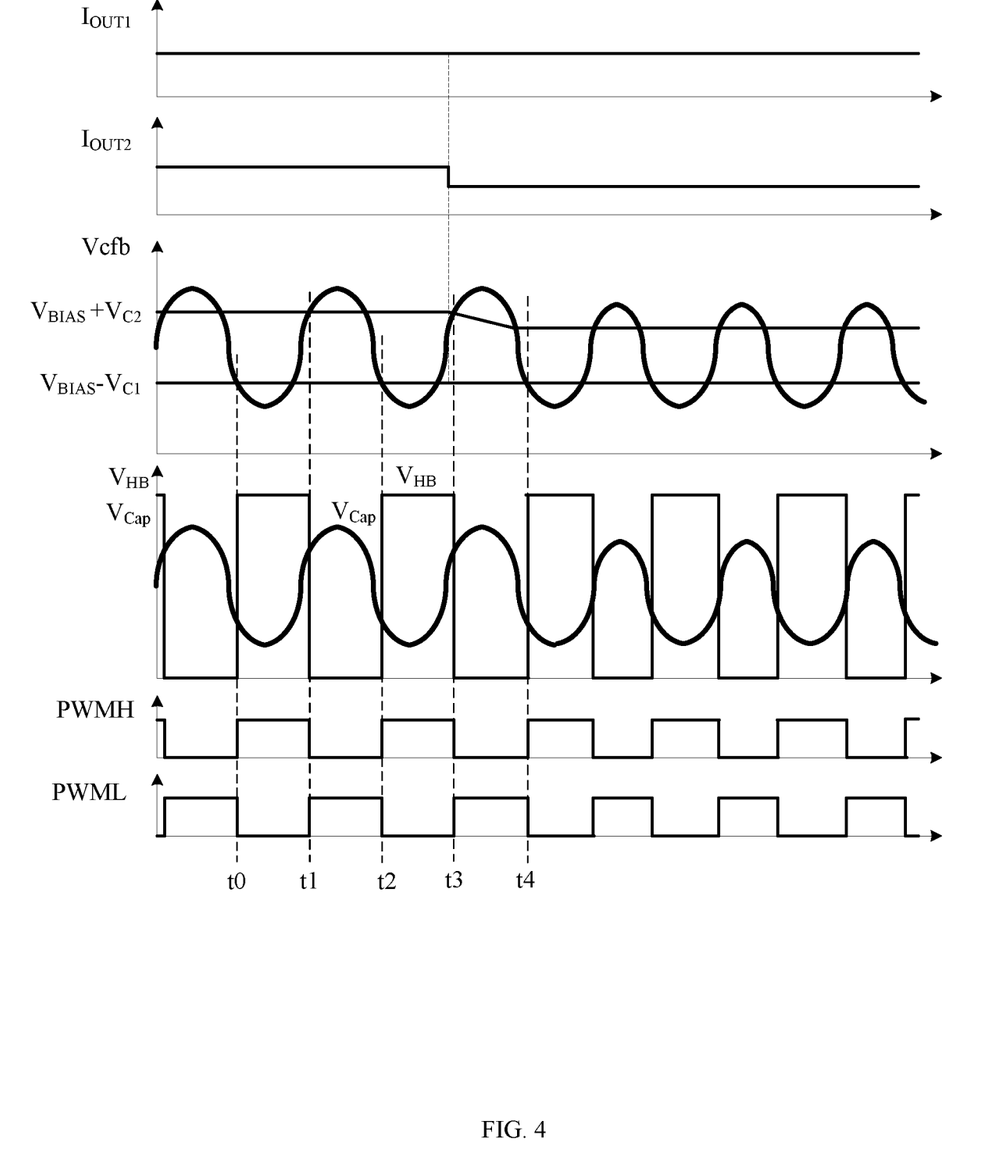
FIG. 4 is waveform diagram of a second example operation of the resonant converter, in accordance with embodiments of the present invention.

Referring now to FIG. 4, shown is a waveform diagram of a second example operation of the second example resonant converter with a control circuit, in accordance with embodiments of the present invention. In this particular example, the regulation principle is described by taking the adjustment for reducing output current $I_{OUT2}$ at the second output terminal as an example. In this example, when output current $I_{OUT2}$ at the second terminal decreases, feedback signal $V_{C2}$ can decrease, such that the time for charge feedback signal Vcfb to rise to the sum $V_{BIAS}+V_{C2}$ of bias voltage $V_{BIAS}$ and feedback signal $V_{C2}$ decreases, and the turn-off moment of transistor Q1 can arrive earlier, thereby reducing the conduction time of transistor Q1. Since the conduction time of transistor Q1 is reduced, during the subsequent conduction period of transistor Q2, the resonant circuit may have a smaller initial energy, which can transfer less energy to the load and maintain the reduction of the output current. In this way, the adjustment of reducing output current $I_{OUT2}$ at the second terminal can be achieved.

When the control circuit operates at the actual application, the change of one output signal may not only cause a change of the feedback signal output by the corresponding drive circuit, but also can cause a change of the feedback signal output by the other drive circuit. This is because the total power output by the resonant converter is related to the feedback signals of the two channels, so the output power of the two channels can be coupled, and the adjustment for the output signal of one channel can also cause the output power of the other channel to change. Therefore, in order to maintain the output power of the other channel as unchanged, the drive circuit of the other channel can also adaptively adjust its output signal.

Figure 5:
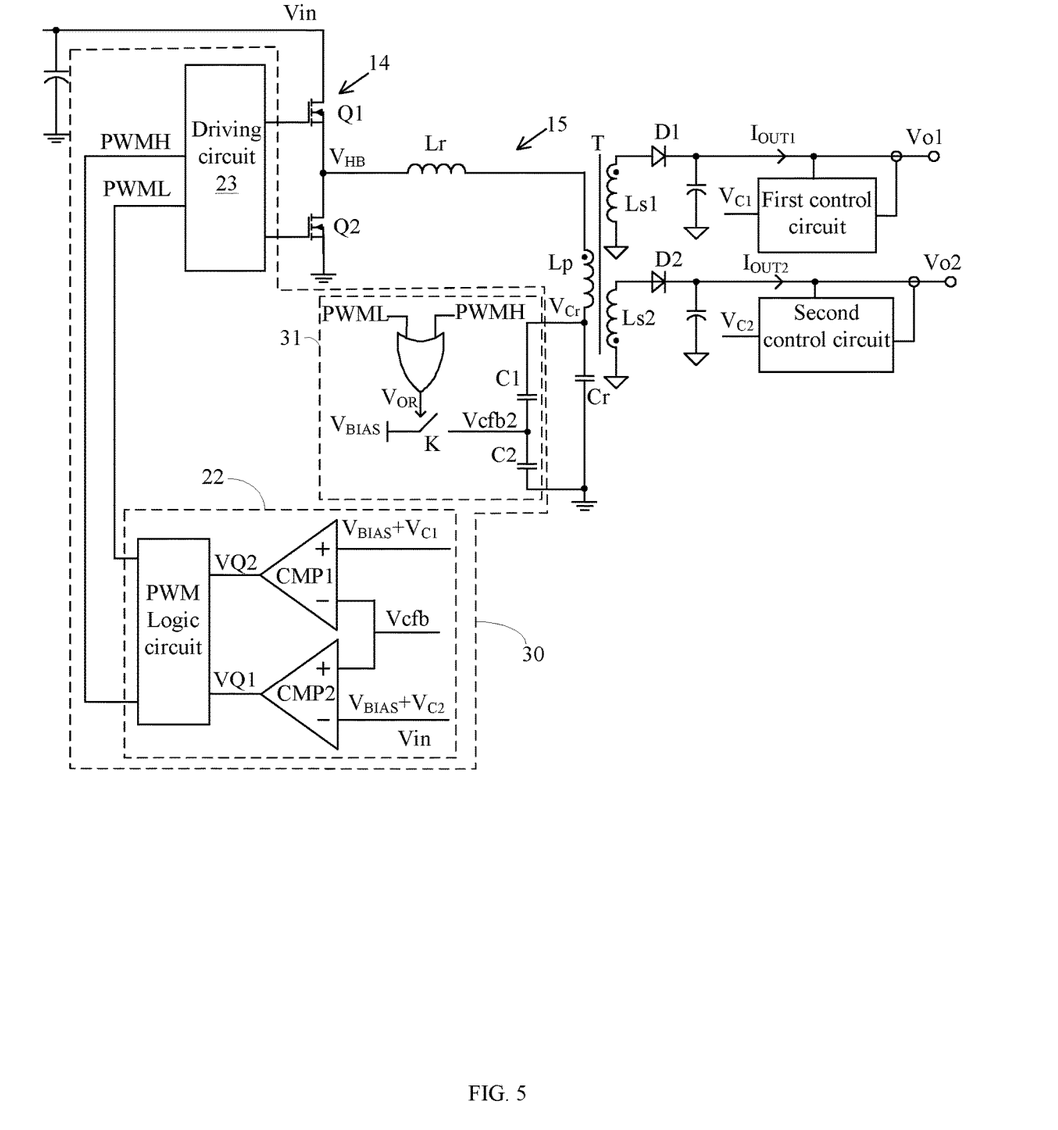
FIG. 5 is a schematic block diagram of a third example resonant converter with a control circuit, in accordance with embodiments of the present invention.

Referring now to FIG. 5, shown is a schematic block diagram of a third example resonant converter with a control circuit, in accordance with embodiments of the present invention. In this particular example, charge feedback circuit 31 can sample the resonant current flowing through the resonant circuit to generate charge feedback signal Vcfb. The DC component of charge feedback signal Vcfb can be equal to bias voltage $V_{BIAS}$. Further, charge feedback circuit 31 can divide the voltage across resonant capacitor Cr in the resonant circuit, and when charge feedback signal Vcfb rises to sum $V_{BIAS}+V_{C2}$ of bias voltage $V_{BIAS}$ and feedback signal $V_{C2}$ (e.g., the falling edge of control signal PWMH), and when charge feedback signal Vcfb falls to the difference between bias voltage $V_{BIAS}$ and feedback signal $V_{C1}$ (e.g., the falling edge of control signal PWML), the divided voltage can be clamped to bias voltage $V_{BIAS}$ to obtain charge feedback signal Vcfb whose DC component is bias voltage $V_{BIAS}$.

In one example, charge feedback circuit 31 can connect in parallel at both terminals of resonant capacitor Cr. Charge feedback circuit 31 can include voltage dividing capacitors C1 and C2 connected in series. The common node of voltage dividing capacitors C1 and C2 can connect to bias voltage $V_{BIAS}$ through switch K, and switch K can be controlled by output signal $V_{OR}$ of the OR-gate circuit. The OR-gate circuit may effectively receive falling edge information of control signal PWMH and falling edge information of control signal PWML, and can generate a high-level output signal $V_{OR}$ when either of the two arrives, such that switch K can be turned on for the dead time.

Thus, when transistor Q1 is turned on, charge feedback signal Vcfb can increase from bias voltage $V_{BIAS}$ to the upper limit. Also, when transistor Q2 is turned on, charge feedback signal Vcfb may drop from bias voltage $V_{BIAS}$ to the lower limit, such that the divided voltage at the common node of dividing capacitors C1 and C2 can be clamped at bias voltage $V_{BIAS}$. Further, voltage feedback circuit 31 in this example may not require additional circuitry to make the DC component of the divided voltage equal to bias voltage $V_{BIAS}$, and can directly obtain charge feedback signal Vcfb at the common node of voltage dividing capacitors C1 and C2.

In particular embodiments, resonant converter can generate a charge feedback signal representing the input charge by sampling the resonant current, and switching control signals according to the charge feedback signal and the feedback signals of the at least two outputs, in order to adjust a turn-off moment of the transistor in the switch circuit to change the conduction time of the transistor. This approach can be effectively equivalent to adding a first-order charge inner loop based on the closed-loop control of the two outputs, but with a simplified control loop to an approximate first-order system. In this way, a higher bandwidth can be controlled with improved dynamic responsive performance, while having relatively simple controls and low associated costs.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A control circuit for a resonant converter having at least two output signals, the control circuit comprising:
   a) a charge feedback circuit configured to generate a charge feedback signal representing a resonant current of a resonant circuit in the resonant converter;
   b) a switching control signal generating circuit configured to generate switching control signals according to the charge feedback signal and feedback signals representing error information of each of the at least two output signals;
   c) wherein the resonant converter comprises a switch circuit for generating a periodic square wave voltage to drive the resonant circuit;
   d) wherein when a first switch unit in the switch circuit is turned on, energy on a primary side of a transformer is transmitted to a first output terminal through a first secondary winding;
   e) wherein when a second switch unit in the switch circuit is turned on, energy on the primary side of the transformer is transmitted to a second output terminal through a second secondary winding;
   f) wherein the first output terminal generates a first output signal, and the second output terminal generates a second output signal; and
   g) wherein the first output terminal is coupled to a dotted terminal of the first secondary winding, and the second output terminal is coupled to a non-dotted terminal of the second secondary winding.

2. The control circuit of claim 1, wherein the switching control signal generating circuit is configured to:
   a) determine a turn-off moment of the second switch unit based on the charge feedback signal and a first feedback signal representing error information of the first output signal; and
   b) determine a turn-off moment of the first switch unit based on the charge feedback signal and a second feedback signal representing the error information of the second output signal.

3. The control circuit of claim 1, wherein a DC component of the charge feedback signal is controlled to be equal to a bias voltage.

4. A control circuit for a resonant converter having at least two output signals, the control circuit comprising:
   a) a charge feedback circuit configured to generate a charge feedback signal representing a resonant current of a resonant circuit in the resonant converter;
   b) a switching control signal generating circuit configured to generate switching control signals according to the charge feedback signal and feedback signals representing error information of each of the at least two output signals;
   c) wherein a DC component of the charge feedback signal is controlled to be equal to a bias voltage;
   d) wherein the switching control signal generating circuit deactivates a first control signal to turn off the first switch unit when the charge feedback signal rises to a sum of the bias voltage and the second feedback signal; and
   e) wherein the periodic square wave voltage generated by the switch circuit is switched from a high voltage corresponding to an input voltage to a low voltage corresponding to a reference ground.

5. A control circuit for a resonant converter having at least two output signals, the control circuit comprising:
   a) a charge feedback circuit configured to generate a charge feedback signal representing a resonant current of a resonant circuit in the resonant converter;
   b) a switching control signal generating circuit configured to generate switching control signals according to the charge feedback signal and feedback signals representing error information of each of the at least two output signals;
   c) wherein a DC component of the charge feedback signal is controlled to be equal to a bias voltage;
   d) wherein the switching control signal generating circuit deactivates a second control signal to turn off the second switch unit when the charge feedback signal drops to a difference between the bias voltage and the first feedback signal; and e) wherein the periodic square wave voltage generated by the switch circuit is switched from a low voltage corresponding to a reference ground to a high voltage corresponding to an input voltage.

6. The control circuit of claim 1, wherein conduction periods of the first switch unit and the second switch unit do not overlap with each other and are a dead time therebetween.

7. The control circuit of claim 1, wherein:
a) the charge feedback circuit is configured to obtain an AC component of the charge feedback signal based on a divided voltage sensed at a voltage across a resonant capacitor in the resonant circuit; and
b) the charge feedback signal is obtained by superimposing the AC component on a bias voltage.

8. The control circuit of claim 7, wherein:
a) the charge feedback circuit is connected in parallel at both terminals of the resonant capacitor, and comprises a first voltage dividing capacitor and a second voltage dividing capacitor connected in series, and
b) the divided voltage that characterizes the AC component of the charge feedback signal is generated at a common node of the first voltage dividing capacitor and the second voltage dividing capacitor.

9. The control circuit of claim 1, wherein:
a) the charge feedback circuit is configured to generate an integration current that changes in a same trend as the resonant current;
b) the integration current charges and discharges a capacitor to generate an AC component of the charge feedback signal; and
c) the charge feedback signal is obtained by superimposing the AC component on a bias voltage.

10. The control circuit of claim 6, wherein the charge feedback circuit clamps the charge feedback signal to a bias voltage during the dead time.

11. The control circuit of claim 2, wherein the charge feedback circuit is configured to divide a voltage of a resonant capacitor in the resonant circuit, and to clamp a divided voltage to a bias voltage at the turn-off moment of the first switch unit and the turn-off moment of the second switch unit, in order to obtain a DC component of the charge feedback signal equal to the bias voltage.

12. The control circuit of claim 1, wherein the switch circuit comprises at least one half bridge.

13. The control circuit of claim 3, wherein a value of the bias voltage is configured to avoid negative values for parameters of the control circuit.

14. The resonant converter, comprising the control circuit of claim 1, and further comprising:
a) a switch circuit comprising at least one half bridge;
b) a transformer comprising a primary winding and at least two secondary winding; and
c) a resonant capacitor coupled in series with the primary winding, in order to form a resonant circuit.

15. The control circuit of claim 1, wherein the control circuit is configured to adjust a switching cycle of the switching control signal when a corresponding one of the output signals changes.

16. The control circuit of claim 1, wherein when one of the output signals increases the switching cycle of a corresponding one of the switching control signals is increased, and one of the output signals decreases the switching cycle of a corresponding one of the switching control signals is decreased.

17. The control circuit of claim 5, wherein the switch circuit comprises at least one half bridge.

18. The control circuit of claim 5, wherein a value of the bias voltage is configured to avoid negative values for parameters of the control circuit.

19. The resonant converter, comprising the control circuit of claim 5, and further comprising:
a) a switch circuit comprising at least one half bridge;
b) a transformer comprising a primary winding and at least two secondary winding; and
c) a resonant capacitor coupled in series with the primary winding, in order to form a resonant circuit.

20. The control circuit of claim 5, wherein the control circuit is configured to adjust a switching cycle of the switching control signal when a corresponding one of the output signals changes.

* * * * *